United States Patent [19]

Martin

[11] 4,084,414

[45] Apr. 18, 1978

[54] ANTI-THEFT DEVICE FOR AUTOMOBILE DOORS

[76] Inventor: Michael D. Martin, 1626 S. Regene St., Pomona, Calif. 91766

[21] Appl. No.: 690,590

[22] Filed: May 27, 1976

[51] Int. Cl.[2] .......... F16C 3/00

[52] U.S. Cl. .......... 70/181; 292/1; 292/347

[58] Field of Search .......... 70/14, 15, 57, 58, 59, 70/181; 292/1, 288, 347

[56] References Cited

U.S. PATENT DOCUMENTS

| | | | |
|---|---|---|---|
| 2,793,064 | 5/1957 | Budoff | 292/288 |
| 3,502,369 | 3/1970 | Trammell | 292/288 X |
| 3,623,758 | 11/1971 | Trinca | 292/347 |
| 3,915,485 | 10/1975 | Richman | 292/1 |

FOREIGN PATENT DOCUMENTS

| | | | |
|---|---|---|---|
| 1,026,347 | 2/1953 | France | 70/14 |
| 2,306,675 | 8/1974 | Germany | 70/181 |

*Primary Examiner*—Robert L. Wolfe
*Attorney, Agent, or Firm*—Boniard I. Brown

[57] ABSTRACT

A device for securing the latch buttons of automobile door locks against tampering from the outside of the vehicle comprises a sleeve engaged upon the shaft of the latch button with a depression, or counterbore, in the upper surface of the sleeve for receiving the lower face of the button proper in the closed - pushed-down - position. The sleeve is preferably made of a plastic or metal material and may be provided with a roughened or knurled outer surface to ease lifting the latch button into the open position. A locking tab may depend from the sleeve and be engaged in a separate lock attached to the inner face of the automobile door.

3 Claims, 5 Drawing Figures

FIG. 1.
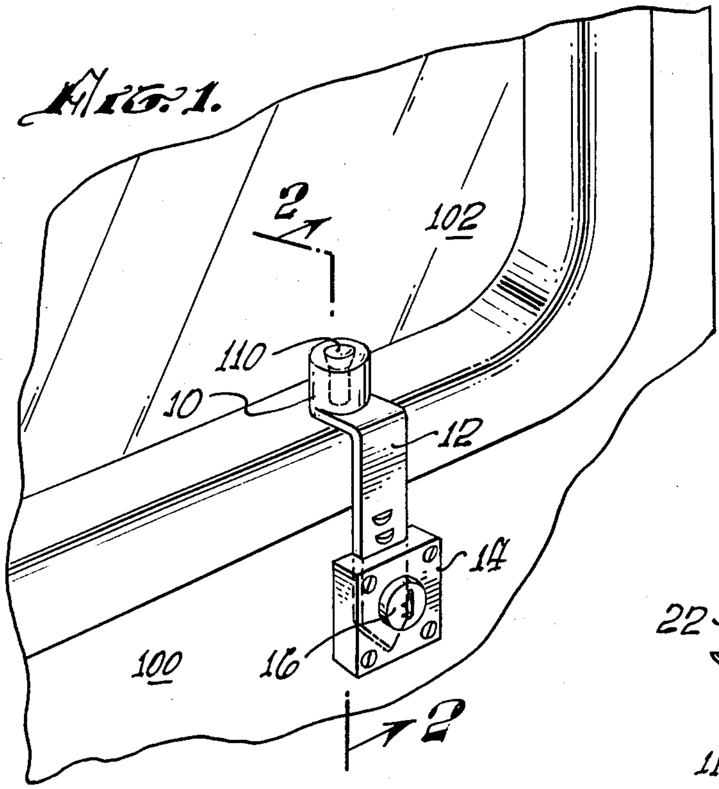
FIG. 4.
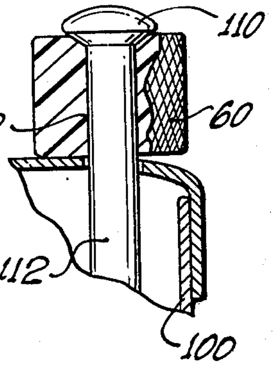
FIG. 2.
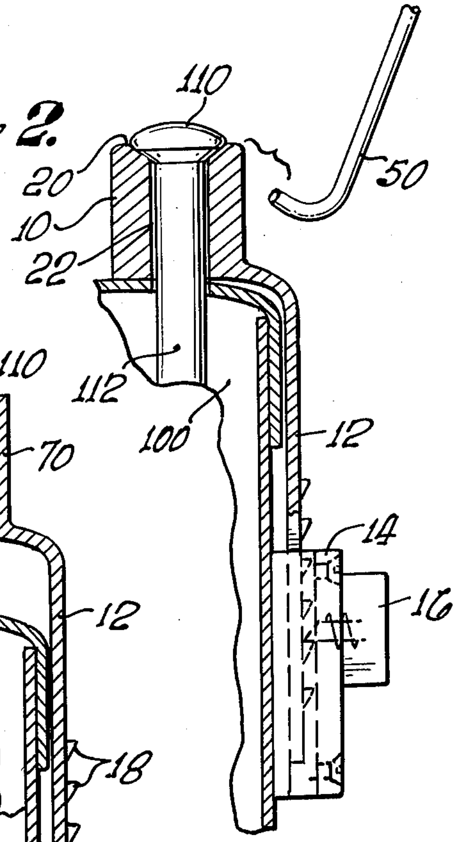
FIG. 3.
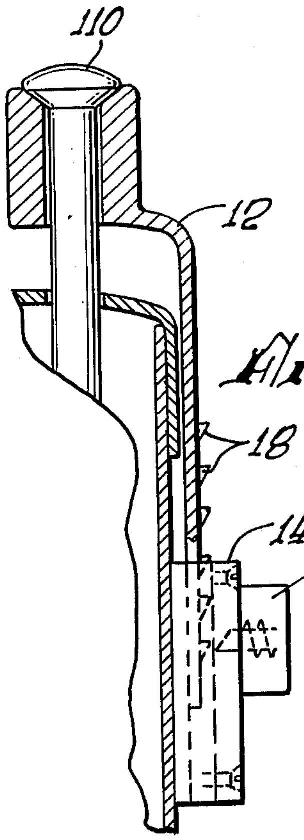
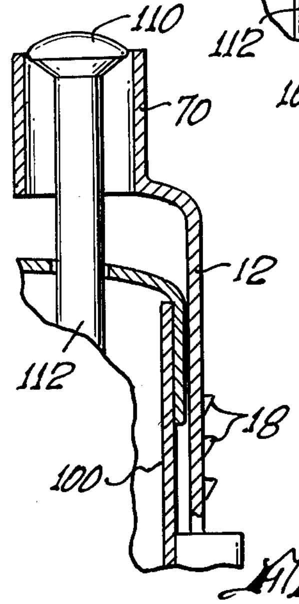
FIG. 5.

ANTI-THEFT DEVICE FOR AUTOMOBILE DOORS

BACKGROUND OF THE INVENTION

The invention relates to anti-theft devices for automobiles. It relates, more particularly, to such devices which inhibit the opening of locked vehicle doors by manipulation of the internal latch button by means of a bent wire or other artifact from the outside.

Theft of automobiles is one of the most common criminal acts in this country and one of the most difficult to prevent. Moreover, stolen cars are relatively rarely recovered, and in many instances the recovered vehicle is found in a condition which prevents the full use and enjoyment by the owner thereafter.

The reason for the widespread car thievery, ranging from temporary 'borrowing' for joyrides to organized rings which 'steal to order,' is the ease with which the conventional locks of a vehicle door can be circumvented, and the equal ease with which a thief, once inside the car, can short-circuit the ignition and drive off with his 'loot.' By far the most common method for gaining entry into an automobile is the use of a bent coathanger, or a more purposebuilt artifact of similar form, to lift up the locking button of a door lock. These locking, or latch, buttons have a mushroom head, for ease of operation by the owner of the car, and access to them can readily be gained by passing the thin wire through the weatherstrip around a window, or by forcing the 'no-draft' window slightly ajar.

The prior art has addressed the problem of making latch buttons — and other door lock operators on the inside — safe from such simple techniques, without success. U.S. Pat. No. 3,416,827 to COLE describes a portable lock of considerable complexity which may be attached to door hardware projecting from the inner face of a car door. The COLE device does not, however, encompass a secure means for preventing the manipulation of latching buttons and is only applicable to the small minority of vehicles in service which do not have such buttons in their door lock systems.

U.S. Pat. No. 2,793,064 to BUDOFF does address itself to the problem of securing the latching button, by providing a cap member with a locking tongue, to be slipped over on top of the button and, subsequently, secured to a lock on the door. The approach of BUDOFF is not, however, applicable to the vast majority of vehicles in which the latch button is mechanically linked to the door lock proper in both directions of operation. In such doors the latch button must be free to move upward when the door is opened from the outside by a key properly inserted into the lock. Since the device of BUDOFF does not permit such movement, or if it does is useless for securing the latch button in the first place, it secures the door not only against a would-be thief but also against the rightful owner of the vehicle; except in the few cases where the door lock can be unlocked without requiring the lifting of the latch button.

It is, therefore, a prime object of the invention to provide a device by means of which a latch button forming part of an automobile door lock system may be secured against engagement by a bent wire artifact, without affecting the normal operation of the button by hand or via the door key.

It is a further object of the invention to teach the construction of a simple anti-theft device readily incorporated in the design of automobile door lock hardware, or retrofitted thereto, which would attain the prime object defined above.

It is yet another object of the invention to provide such an anti-theft device in a form which is economical to produce and simple to install.

It is also an object of the invention to teach the use and application of secondary locking mechanisms, in anti-theft devices of such nature, further ensuring that no portion of the combined latch button and anti-theft device system is accessible to engagement by an externally manipulated wire antifact or the like.

SUMMARY OF THE INVENTION

The above objects, and other objects and advantages which shall become apparent from the detailed description of the preferred embodiment thereof, are attained in a device in the form a spool or sleeve, slideably engaged on the cylindrical shaft of the automobile door latch button.

The tubular sleeve member has an external diameter which is larger than the largest diameter of the button head and is also provided with a depression in its uppermost surface which mates with the head of the latch button and encompasses it, at least sufficiently to shield the aforementioned largest diameter thereof. The outer surface of the sleeve may be roughened or knurled to provide a good fingerhold to someone inside the automobile and wishing to raise the latch button from its depressed position. This latter provision is particularly advantageous where the door-opening handle is itself locked by the depression of the latch button so as to secure the door lock in a safe and inoperable condtion.

In a further development of the anti-theft device a flexible strap is integrally attached to the sleeve and a lockable buckle is provided on the inner face of the door, directly below the latch button, in which the strap may be engaged and tensioned prior to locking entrapment.

This supplementary feature ensures that even devices more sophisticated than the common 'bent wire' puller cannot lift the button, or the sleeve, by grasping or undercutting some portion of the sleeve periphery, or by insertion of a thin blade under the sleeve base. Any increase in the difficulty of gaining access to the car interior represents a quantum jump in the security of the vehicle against thief. The accomplished car theif operates with the knowledge that in a car not otherwise secured but merely locked in the manner accepted in the trade, a bent wire will permit him to get inside in no more time, and frequently less, than would be taken by someone with the appropriate key. The slipping of a wire past a window edge, the engagement of the button head with the bent end of the wire and a quick pull on the projecting shank; the procedure takes less time than the verbal description. In a car equipped with the anti-theft device of the invention, this easy approach is frustrated at a negligible cost.

BRIEF DESCRIPTION OF THE ACCOMPANYING DRAWINGS

The preferred embodiment of the invention is described below, with reference to the accompanying drawings, in which:

FIG. 1 is a partial view of the inner face of a typical automobile door with a latch button, and an anti-theft device of the invention secured onto the latch button to prevent its unauthorized operation;

FIG. 2 is a partial section, taken along section line 2—2 of FIG. 1, showing the integral tab of the device locked to the car door;

FIG. 3 is a view similar to FIG. 2 with the tab unlocked;

FIG. 4 is a partially sectioned view of another embodiment of the device of the invention; and FIG. 5 is a partially sectioned view of another embodiment of the invention.

DESCRIPTION OF THE PREFERRED EMBODIMENT

FIG. 1 is a partial, perspective view of a car door 100, with window 102 and door latch button 110. The shank of the latch button 110 is engaged by a sleeve 10. A strap 12 is rigidly affixed to the lower surface of the sleeve 10, and the head of the latch button 110 is pocketed inside a depression in the upper surface of the sleeve. A lock 114 is affixed to the inner panel of the door 100, and engages the strap 12; this engagement may be made and unmade by means of a key operating a locking mechanism 16 in the lock 14.

FIG. 2 is a partial transverse section of the assembly of FIG. 1, taken along section line 2—2. The door latch button 110 is seen supported by a cylindrical shank 112 which passes through the sheet metal of the door 100 to interact with the door lock mechanism. The sleeve 10 is slideably engaged upon the shank 112 through a central orifice 22, and the head of the button 110 is received into a depression 20 countersunk into the upper surface of the sleeve. The depression 20 is shaped and dimensioned in such a manner that with the button 110 pushed down into the 'lock' position, the head thereof is pocketed inside the depression with a minimal clearance much smaller than the dimension of a wire tool 50 which may be used in an attempt to life the button into the 'unlock' position.

FIG. 3 is a view similar to that shown in FIG. 2, with the latch button 110 raised into the 'unlock' position and with the strap 12 depending from the lower end of the sleeve 10 released from the lock assembly 14. The engagement between the strap 12 and the lock 14 is preferably made by means of raised catches 18 in the forward surface of the former and a shaped slider 38 associated with the latter. The details of the lock operation are not shown for the sake of clarity of illustration; any one of a number of different basic lock mechanisms known in the art may be employed without departure from the teaching inherent herein. The nature and development of the lock mechanism 14 form no part of the invention proper.

FIG. 4 is a partial transverse section through a basic embodiment of the invention, incorporating an anti-theft device comprised of a sleeve 60 with a central orifice 22 which is a sliding fit upon the shank 112 of a door latch button 110. A shaped depression 70 is countersunk into the upper surface of the sleeve 60 and shields the latch button 110 up to, and including, the equator thereof in the 'locked' position illustrated. It should be noted in this regard that the elevation of the actual button head above the sill of the door 100 is generally adjustable by means of an integral threaded joint between the button shank 112 and the doorlock mechanism, so that the pocketed relationship of the latch button is readily attained upon the installation of the sleeve member 60, or its analogue 10. Where such an adjustment is not available, or the range of adjustment is insufficient to ensure proper alignment between the sleeve depression and the latch button, a sleeve of appropriately longer or shorter axial dimension may be substituted for the unaccomodating part.

The outer surface of the button 60 may be knurled or otherwise roughened to provide a good fingerhold for the user. Similar treatment of the surface of the sleeve 10 may not be required, due to the presence of the strap 12 and its utility in lifting the latch button into the 'unlock' position.

FIG. 5 shows in a partial transverse sectional view, an embodiment of the invention wherein a sleeve 70 of a type which differs from those hereinbefore described, is rigidly affixed to or integral with strap 12, the strap is similar to that hereinbefore described. Sleeve 70 is disposed about shank 112 and is proportioned to extend about the head portion of latch button 110, as shown.

If there should exist a small space or looseness between the sleeve portion 70 and the doorsill, either from a loose assembly of the components, or from the tampering action of a would-be thief, as by utilizing a wire or coat hanger as hereinbefore mentioned, attempts to raise the door button by using an instrument, wire device, etc., is frustrated, because such action only move upward the sleeve 70 about the door button head without affecting or raising the latch button 110. Such efforts of a would-be thief are thus defeated. The latch button may conveniently be depressed manually to latch the door.

The material of the various embodiments of the invention may be a metal, a plastic composition or wood, or any other solid substance.

The method of manufacture of the device of the invention may take many forms: turning from the solid, casting and molding are some of the applicable techniques. Embodiments with integral straps are preferably molded of relatively soft plastic compositions, providing sufficient rigidity for the sleeve proper and flexibility for the strap portion.

The multiple catches on the strap ensure that one of them is in proper alignment with the button down and the strap stretched, for engagement with the bolt of the lock. In a simpler embodiment the strap may be provided with a plurality of holes and the lock may take the form of a projecting stud, over which one of the holes may be slipped.

It may also occur that a particular vehicle windowsill is of such large curvature in the region of the latch button that the lower surface of the sleeve must be sculptured to mate therewith, lest a crack sufficient for potential engagement by a wire hook be presented to a would-be thief.

Many such variations in the basic embodiments of the invention may commend themselves to one skilled in the art, once exposed to the teachings herein. It is intended that such variations shall be encompassed by the disclosure, the invention being delimited only by the appended claims.

The inventor claims:

1. An anti-theft device to prevent the unauthorized operation of an automobile door latch button reciprocable in a vertical direction, provided with a substantially cylindrical shank and an enlarged head portion, and projecting from the inward sill of said door, comprising:

a generally cylindrical sleeve disposed about said latch button, strap means depending from said sleeve, a plurality of locating stops vertically spaced from one another in the surface of said strap means, lock means, attached to the inner surface of said door, for lockingly engaging one of said locating stops, said sleeve having its inner orifice in sliding engagement with the shank of said latch button and having an outer diameter larger than the diameter of said head portion, and said sleeve having a depression in its upper surface for receiving the head of said button in the lowermost position thereof, whereby said head is rendered inaccessible to unauthorized persons.

2. An anti-theft device according to claim 1 wherein: said locating stops are formed as ramped catches on the inward face of said strap means.

3. An anti-theft device according to claim 1 wherein: the inner diameter of the sleeve exceeds that of the head portion of the button, and the sleeve extends about the head portion.

* * * * *